Sept. 4, 1923.

R. M. LOVEJOY 1,467,051

SPRING SHACKLE FOR VEHICLES

Filed April 11, 1922   2 Sheets-Sheet 2

Inventor—
Ralph M. Lovejoy
By— Heard Smith & Tennant
Attorneys.

Sept. 4 1923.

R. M. LOVEJOY

SPRING SHACKLE FOR VEHICLES

Filed April 11, 1922     2 Sheets-Sheet 1

1,467,051

Inventor—
Ralph M. Lovejoy.
By— Heard Smith & Tennant
Attorneys.

Patented Sept. 4, 1923.

1,467,051

UNITED STATES PATENT OFFICE.

RALPH M. LOVEJOY, OF MEREDITH, NEW HAMPSHIRE.

SPRING SHACKLE FOR VEHICLES.

Application filed April 11, 1922. Serial No. 551,584.

*To all whom it may concern:*

Be it known that I, RALPH M. LOVEJOY, a citizen of the United States, and resident of Meredith, county of Belknap, State of New Hampshire, have invented an Improvement in Spring Shackles for Vehicles, of which the following description, in connection with the accompanying drawing, is a specification, like characters on the drawing representing like parts.

This invention relates to improvements in spring shackles for vehicles and one of the objects thereof is to provide a shackle comprising a member, pivotally mounted to swing about a horizontal axis, and pivotally connected to the spring in such a manner as to permit relative longitudinal movement between the frame and the spring and to prevent lateral movement of said swinging member due to the sidewise or torsional movement of the spring.

A further object of the invention is to provide a spring shackle of the character described with anti-friction bearings for the swinging member which will permit unrestrained swinging movement and which will so engage the swinging member as to present relatively large areas engaging said swinging member to prevent lateral movement thereof.

A further object of the invention is to provide a swinging member of the character described with trunnions which are enclosed in bearing members having linings of fibrous anti-friction material, preferably oil-soaked wood cut diagonally of the grain, adapted to present a maximum surface of end grain for engagement with the trunnions and body of the swinging member.

A further object of the invention is to provide a bearing of the character described with means for preventing rotation of said bearing members about the axis upon which they are mounted.

A further object of the invention is to provide novel means for taking up wear between the bearing and the trunnions of the swinging member.

A further object of the invention is to provide a shackle having a swinging member of the character described with a novel universal joint for connecting the same to the spring of the vehicle.

Another object of the invention is to provide means for preventing disengagement of the members of the universal joint in case an abnormal relative movement is produced between the spring and the frame. Various means are illustrated herein for accomplishing this purpose.

These and other objects and features of the invention will more fully appear from the following description and the accompanying drawings and will be pointed out in the claims.

Preferred forms of spring shackle embodying the present invention are illustrated herein as applied to the metallic frame and spring of a vehicle, such as, a usual type of automobile, but it will be understood that the spring shackle embodying the invention herein may be used in various other relations within the spirit and scope of the claims.

Figure 9:
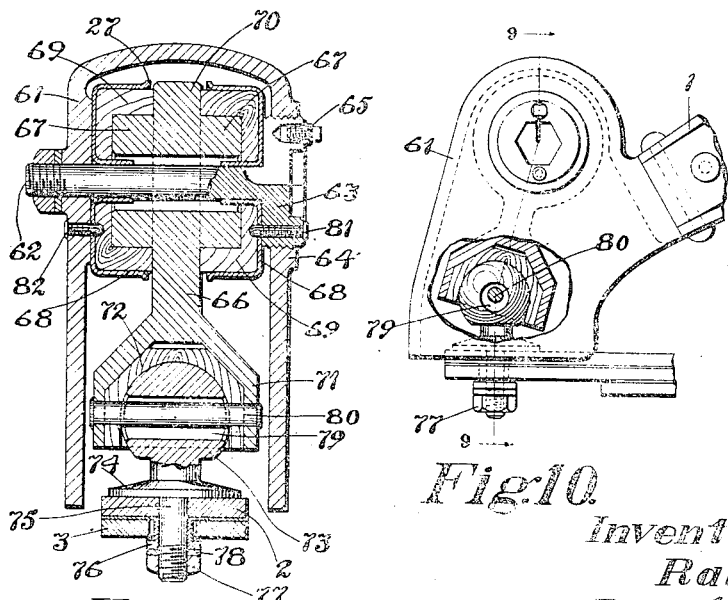
Fig. 9 is a vertical sectional view similar to Fig. 2 of a spring shackle embodying the invention showing a different means for preventing disengagement of the members of the universal joint which connects the swinging member to the spring.
Figure 10:
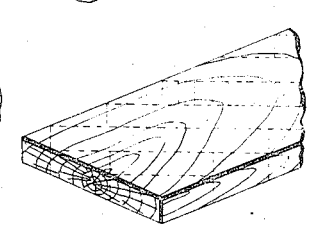
Figure 11:
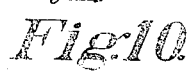

Fig. 10 is a side elevation of the end portion of the frame, the spring shackle and spring illustrated in Fig. 9, a portion of the casing being broken away to disclose the universal joint which connects the swinging member to the spring, a portion of said joint being shown in section; and, Fig. 11 is a perspective view of a block of wood cut diagonally of the grain, such as preferably is employed, and soaked with oil, as a lining or bushing for the bearings of the members of the spring shackle embodying the invention.

The spring shackle embodying the present invention is illustrated herein as applied to the end of one of the bars 1 of the frame of a vehicle, such as an automobile, and the spring of the vehicle which comprises an upper long leaf 2, a second leaf 3 having a slot 4 in its end of greater width than the stud which connects a member of the shackle to the upper leaf 2 to permit relative longitudinal movement between the leaves 2 and 3 of the spring, and a plurality of other spring leaves 5 and 6 of successively decreasing length such as are usual in the springs of automobiles and other vehicles.

The spring shackle which is illustrated herein comprises a casing 7 preferably having a dome-shaped upper end 8 and substantially parallel sides 9 and 10 and provided with a laterally extending arm 11 which is connected by suitable rivets 12 to the frame 1. The arm 11 desirably also is provided with a cylindrical boss 13 to receive a bolt or rivet 14 extending through the flanges of the frame 1.

The casing desirably is provided near its upper end with an internally extending boss 15 having a flat or finished surface to provide an abutment for the end of one of the bearing members for the trunnions of the swinging member, and the opposite side of the casing 10 is provided with an outwardly extending boss 16 for the purpose of producing a thickened wall to receive the screw threaded head 17 of a bolt 18 which preferably forms the pivot for supporting the swinging member of the shackle. The head 17 of the bolt 18 presents a flat surface of considerable area disposed in parallelism with the surface 15 and adapted to engage the other bearing member for the trunnion of the swinging member as will hereinafter more fully appear. The head 17 of the bolt 18 is provided with an hexagonal tool socket and preferably is slotted radially. A screw threaded expanding plug 19 is driven into suitable complementary screw threaded sockets in opposite walls of the slot so that the head is expanded in the socket of the boss 16 and locked firmly therein. By this means a permanent adjustment of the head 17 may be provided for the purpose of taking up wear in the bearings of the shackle members.

The movable portions of the shackle comprise a swinging member which is pivotally mounted in the casing to swing about a horizontal axis only, this swinging member being provided with a head which is pivotally connected to the end of the upper leaf of the spring preferably by means of a universal joint. In the preferred construction illustrated herein the swinging member comprises a body portion 20 preferably of substantially cylindrical form having trunnions 21 and 22 extending laterally from its opposite faces. The body portion and the trunnions are provided with a relatively large central aperture 23 of considerably greater diameter than that of the bolt 19 upon which the swinging member is mounted. The trunnions 21 and 22 of the swinging member are mounted in anti-friction bearings which are carried by the bolt 18. In the preferred construction illustrated herein these bearings comprise cylindrical cup-shaped members having flat bases 24, peripheral cylindrical walls 25 and central cylindrical walls 26 which fit upon the bolt 18.

Figure 8:
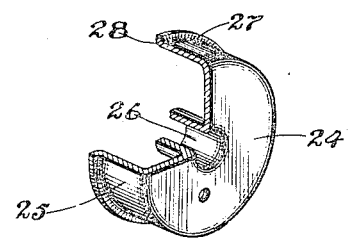
Fig. 8 is a perspective view, partially broken out, of the preferred form of cup-shaped bearing member adapted to receive a lining of fibrous material to form a bearing for the trunnion of the swinging member.

The outer walls 25 desirably are provided with marginal flanges 27, see Fig. 8, which serve to strengthen the walls and also provide curved inner edges 28 to enable the lining or bushing of the bearing to be more readily introduced. The bearings are provided with linings of anti-friction material which surround the trunnions and desirably extend slightly beyond the ends of the cylindrical walls 25 of the bearing members to engage the faces of the cylindrical body portion 20 of the swinging member.

Any desirable anti-friction lining 29 of fibrous material may be used. Preferably, however, the lining comprises a cup-shaped body of wood soaked in oil, the wood being cut diagonally of the grain as illustrated in Fig. 11 in order that a maximum amount of ends of the fibres may be presented to the ends and cylindrical walls of the trunnion members 21 and 22. These cup-shaped lining members desirably are forced into the cup-shaped metallic bearing members under pressure and the lining bearings thereafter forced under pressure upon the trunnions so that the trunnions are completely embraced by the lining members 29 and the ends of the lining members abut against the flat faces of the body of the swinging member.

Figure 2:
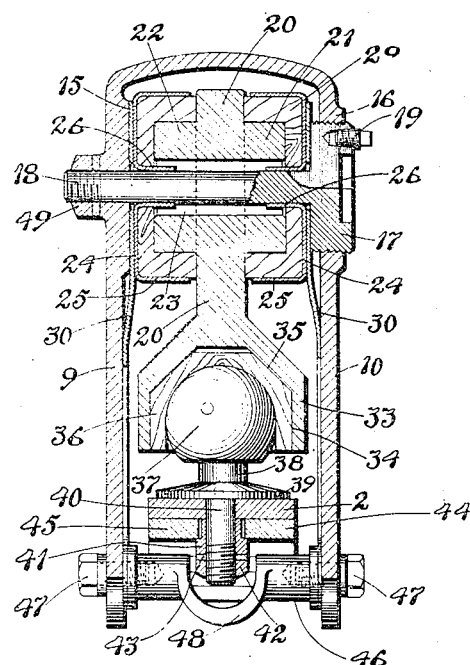
Fig. 2 is a sectional view on line 2—2, Fig. 1.

Means are provided for preventing rotation of the bearing members within the casing. As illustrated in Fig. 2 straps 30 are connected by spot welding, or otherwise, to the metallic bases 24 of the bearing members and the ends of the straps 30 secured against movement. As illustrated herein the lower ends of the straps 30 are provided with enlarged circular portions 31 having central apertures 32 through which extends a suitable anchoring member which, as illustrated in Fig. 2, comprises screws for securing the transverse stop member for the spring to the casing.

The swinging member desirably is provided with an enlarged head 33 which is provided with a suitable socket forming a part of a universal joint by means of which the swinging member is connected to the end of the spring.

Figure 1:
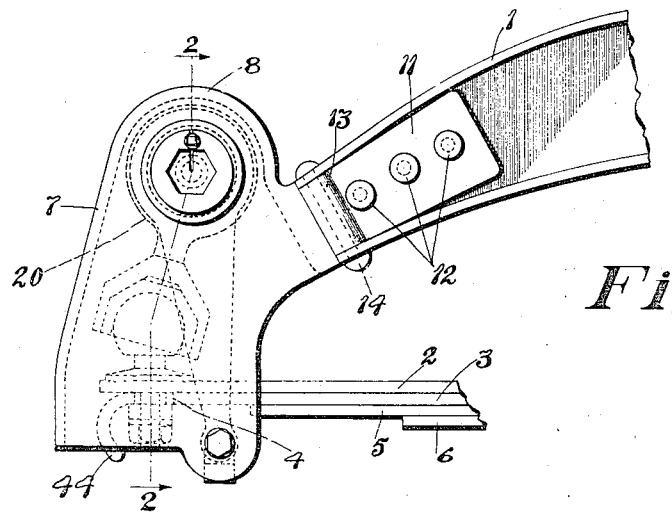
Fig. 1 is a side elevation of the end portion of the frame and of the spring of an automobile connected by a spring shackle embodying the invention.

In the particular construction illustrated in Figs. 1 and 2 the head 33 of the swinging member is provided with a lower cylindrical recess 34, and an upper tapering, preferably truncated conoidal recess 35. A lining 36 of fibrous material, having a periphery conforming to the cylindrical and conoidal walls of the recess in the head and provided with a central spheroidal socket, is forced into the recess in the head portion preferably under pressure. The lining 36 may be of any suitable fibrous material, but preferably is of oil-soaked wood cut transversely of the grain so that the ends of the grain fibres are presented for engagement with the ball which is seated in said recess. The ball 37, which is seated in the socket in the head member, is provided with a short shank 38 and an enlarged base 39, the under face of which rests upon the upper face of the end of the upper spring leaf 2. A stem 40 extends downwardly through a suitable aperture in the upper spring leaf 2 and a collar or sleeve 41 abuts against the under face of the leaf 2 and is clamped against the same by a nut 42, a lock washer 43 desirably being interposed between the nut and the collar 41. By thus locating the universal joint in proximity to the spring free torsional movements of the spring are permitted which do not impose any undue lateral strain upon the swinging member.

The second leaf spring 3, in the construction shown in Figs. 1 and 2, is provided with an extended slotted or bifurcated end, the members 44 and 45 of which extend upon opposite sides of the sleeve 41. The end portions 44 and 45 of the second leaf spring desirably are curved downwardly to provide hooks adapted to be engaged by a suitable stop to prevent disengagement of the ball and socket in the event of abnormal relative movement between the spring and frame.

A convenient form of stop which is illustrated in Fig. 2 comprises a transverse bar 46 extending across the lower end of the casing between the walls 9 and 10 thereof and secured at its ends to the casing members 9 and 10 by screws 47 which extend through the walls of the casing 9 and 10 into the ends of the member 46. The central portion of the member 46 is provided with a downwardly extending U-shaped portion 48 to prevent engagement of the nut 42 with said member to permit the hook-shaped ends 41 of the spring to be engaged and limited in movement thereby.

Figure 3:
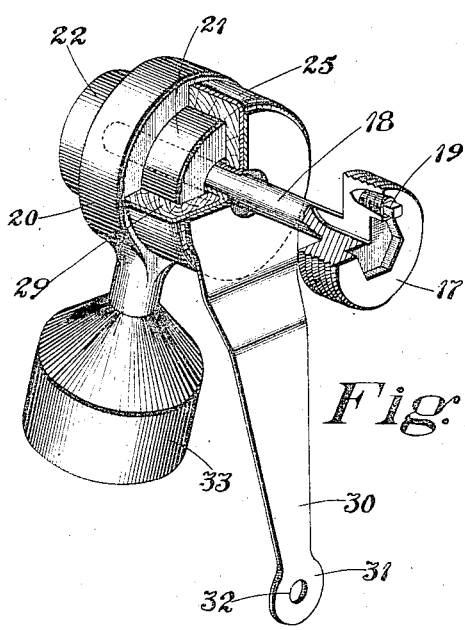
Fig. 3 is a perspective view, partly broken away, of the swinging member of the spring shackle, the bearings in which it is mounted and the supporting shaft or bolt for said bearings.

In the construction illustrated in Figs. 1, 2 and 3 the screws 47 pass through the apertures 32 in the ends of the straps 30 which are connected to the bases 24 of the bearings and serve as anchors to prevent rotation of the bearings about the bolt 18. By reason of the construction above described it is obvious that the longitudinal movement of the spring, due to the normal compression of the spring, will cause the swinging member to oscillate in a vertical plane about a horizontal axis corresponding to the axis of the bolt 19. Any lateral relative movement between the frame and the spring will be resisted by the engagement of the trunnions of the swinging member with the bearings and also by the engagement of the enlarged cylindrical body of the swinging member with the ends of the anti-friction linings of the bearings so that such lateral movement will be effectively prevented without material wear upon these extended bearing surfaces. Any lateral thrust, due to torsional movement of the spring, will be likewise resisted in the same manner, but the freedom of torsional movement of the spring permitted by the universal connection between the end of the spring and the head of the swinging member will ordinarily prevent lateral torsional strain from being imposed upon the swinging member. If any wear occurs in the bearings of the enlarged head and trunnions of the swinging member such wear may be compensated for by loosening the wedge plug 19 and screwing in the head of the bolt and thereafter setting up the nut 49 upon the end of the bolt 18.

Figure 4:
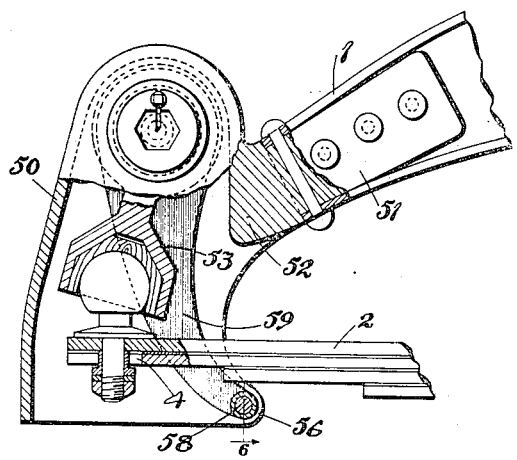
Fig. 4 is a view, partly in vertical section, of the end portion of the frame and spring of an automobile showing partially in section a modified and preferred form of spring shackle embodying the invention with the parts in normal position.
Figure 5:
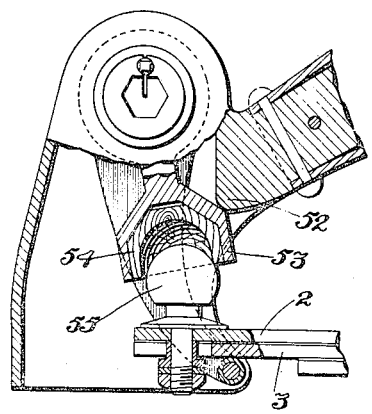
Fig. 5 is a similar view of the construction illustrated in Fig. 4 showing the parts in a possible abnormal position due to an excessive relative movement between the spring and frame.
Figures 6, 7:
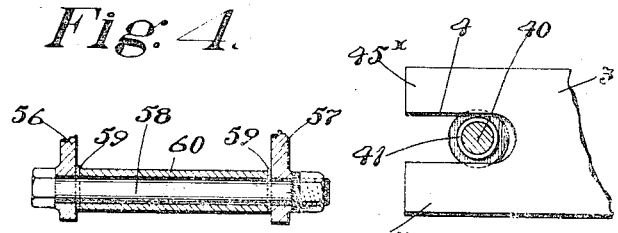
Fig. 6 is a detail sectional view on line 6—6, Fig. 4, of a means connecting the sides of the casing adapted to prevent disengagement of the members of the universal joint which connect the spring to the swinging member of the shackle.
Fig. 7 is a plan view of the slotted end of the second leaf spring showing the sleeve and stud by which the ball of the universal joint is connected to the upper spring member.

In Figs. 4 and 5 a simplified preferred construction is illustrated in which a different mechanism is provided for preventing an abnormal relative movement of the frame and spring from disengaging the ball and socket members of the universal joint. In this construction the casing 50 is of slightly different form and the arm 51, by which it is connected to the frame 1, is provided with a shoulder 52 which extends downwardly sufficiently to engage the head 53 of the swinging member as illustrated in Fig. 3. The swinging member may be and is identical with the swinging member illustrated in Figs. 1, 2 and 3 heretofore described and is provided with a suitable fibrous lining 54 having a spheroidal socket to receive a ball 55 which is connected to the upper spring leaf 2 in the manner above described. In this construction, however, the next lower spring leaf 3 is provided with a slotted end, the members 44ˣ and 45ˣ of which are not provided with the hooked portions. The lower portion of the casing instead of extending directly downwardly as illustrated in Fig. 2 is provided with rearwardly extending walls 56 and 57 which are connected by a bolt 58. The straps 59 which are connected to the bearing members are of slightly different form than the straps 30 illustrated in Figs. 1, 2 and 3 and the ends of said straps are provided with apertures which receive the bolt 58. A spacing sleeve 60, surrounding the bolt 58, serves to press the ends of the straps 59 against the casing members, and to slightly spread the casing walls so that when the nut on the bolt 58 is tightened up great rigidity is imparted to the lower end of the casing.

In Figs. 9 and 10 a further modified means is illustrated for preventing disengagement of the ball and socket members of the universal joint which connects the swinging member to the spring. In this construction the casing 61 is connected to the frame 1 in the same manner as above described, but is of slightly different form and somewhat shorter than in the preceding constructions. The casing in this construction, like that illustrated in Fig. 1, is provided with a pivotal bolt 62 having an enlarged head 63 provided with a screw threaded periphery engaging complementary screw threads in a boss 64 in the wall of the casing 61. The head 63 of the bolt is slotted and provided with a screw threaded expanding plug 65 as above described. The swinging member 66 is pivotally mounted to swing about the axis of the bolt 62 and is provided with trunnions 67 which are mounted in bearings 68 having linings 69 of fibrous material embracing the trunnions 67 and abutting against the faces of the cylindrical portion 70 of the swinging member 66. The swinging member 66 is provided with a head 71 having a cylindrical and communicating conoidal recess in which a lining 72 of oil-soaked wood, or other fibrous material of the character above described, is seated. This fibrous lining is provided with a spheroidal socket adapted to receive a ball 73 which is connected to the upper spring leaf 2. The ball 73 is provided with a base 74 which rests upon the upper face of the spring leaf 2 and is connected to said leaf by a stem 75 and a sleeve 76 abutting against the under face of said spring leaf 2 and retained in position by a nut 77 and a lock washer 78 as above described.

In this construction the ball 73 is provided with a transverse, relatively large, aperture 79 and a pin 80 extending diametrically through the cylindrical portion of the head and said aperture serves to prevent disengagement of the ball and socket of the universal joint in the event of excessive relative movements therebetween. It will be noted that the pin 80 is located somewhat above the center of the aperture 79 in the ball in order to provide for wear between the ball and the fibrous lining of the socket.

In the construction illustrated in Figs. 9 and 10 rotation of the bearings about the pivotal bolt 62 is prevented by screws 81 and 82 extending respectively through the walls of the casing and the metallic bearing members 68 instead of being prevented from movement by arms secured to the bases of the bearing members and anchored to screws or bolts extending through the walls of the casing.

It will be noted that the various forms of spring shackle illustrated herein all embody the same general principles in that all include a swinging member pivotally mounted to oscillate about a horizontal axis, bearings for said swinging member adapted to prevent lateral movement thereof while permitting free swinging movement about said horizontal axis and a universal coupling connecting the swinging member to the spring. In all of the constructions illustrated means are provided for preventing rotation of the bearings for the swinging member and in all of the constructions means are provided for preventing disengagement of the members of the universal coupling between the swinging member and the spring although the various means for preventing such disengagement differ in detail. In each of the constructions the bearings for the swinging member and the universal joint between the swinging member and the spring are provided with linings of fibrous anti-friction material, preferably wood cut diagonally of the grain and soaked with oil. It will, therefore, be understood that the claims herein presented are designed to cover all of the various forms herein illustrated as well as other forms of equivalent devices though varying in construction and arrangement of parts. Consequently, it will be obvious that the embodiments of the invention disclosed herein are illustrative and not restrictive and that the following claims are intended to cover any constructions within their scope.

Having thus described my invention, what I claim as new, and desire to secure by Letters Patent, is:

1. A spring shackle for vehicles comprising a casing adapted to be connected to the frame of a vehicle, a member pivotally mounted in said casing to swing about a horizontal axis, bearing members engaging opposite sides of said swinging member at a distance from said axis acting to prevent lateral movement of said swinging member and means for pivotally connecting said member to the spring.

2. A spring shackle for vehicles comprising a casing adapted to be connected to the frame of a vehicle, a member pivotally mounted in said casing to swing about a horizontal axis, bearing members engaging opposite sides of said swinging member at a distance from said axis acting to prevent lateral movement of said swinging member and means including a universal joint for connecting said member to said spring.

3. A spring shackle for vehicles comprising a casing adapted to be connected to the frame of a vehicle, a member pivotally mounted in said casing to swing about a horizontal axis, a socket in the free end of said member, a ball complementary to said socket and means for rigidly securing said ball to said spring in proximity thereto whereby free torsional movements of said spring will be permitted.

4. A spring shackle for vehicles comprising a casing adapted to be connected to the frame of a vehicle, a member pivotally mounted in said casing to swing about a horizontal axis, a socket in the free end of said member provided with a tapering recess having a lining of fibrous anti-friction material providing a spheroidal socket and a ball complementary to said socket adapted to be secured to the spring.

5. A spring shackle for vehicles comprising a casing adapted to be connected to the frame of a vehicle, a member pivotally mounted in said casing to swing about a horizontal axis, a socket in the free end of said member and a ball complementary to said socket adapted to be secured to said spring and means for preventing disengagement of said ball from said socket in event of abnormal relative movement between the frame and spring.

6. A spring shackle for vehicles comprising a casing adapted to be connected to the frame of a vehicle, a member having laterally extending trunnions pivotally mounted in anti-friction bearings in said casing to swing about a horizontal axis and means including a universal joint for connecting said member to the spring.

7. A spring shackle for vehicles comprising a casing adapted to be connected to the frame of a vehicle, a member having laterally extending trunnions pivotally mounted in said casing, having members of anti-friction material surrounding said trunnions acting to prevent lateral swinging of said member and means for pivotally connecting said member to the spring.

8. A spring shackle for vehicles comprising a casing adapted to be connected to the frame of a vehicle, a member having laterally extending trunnions pivotally mounted in said casing, having members of anti-friction material surrounding said trunnions acting to prevent lateral swinging of said member, adjustable means for taking up the wear of said anti-friction members and means for pivotally connecting said swinging member to the spring.

9. A spring shackle for vehicles comprising a casing adapted to be connected to the frame of a vehicle, a member comprising a flat body portion having laterally extending trunnions pivotally mounted in said casing to swing about a horizontal axis, cup-shaped bearings enclosing the ends of said trunnions having anti-friction members abutting against said flat body acting to prevent lateral swinging of said member and means for pivotally connecting said swinging member to the spring.

10. A spring shackle for vehicles comprising a casing adapted to be connected to the frame of a vehicle, a member comprising a flat body portion having laterally extending trunnions pivotally mounted in said casing to swing about a horizontal axis, cup-shaped bearings having lining members of anti-friction material surrounding said trunnions and abutting against said flat body acting to prevent lateral swinging of said member, means for adjusting one of said cup-shaped bearings longitudinally of said axis to take up wear and means for pivotally connecting said member to said spring.

11. A spring shackle for vehicles comprising a casing adapted to be connected to the frame of a vehicle, a member comprising a flat body portion having laterally extending trunnions pivotally mounted in said casing to swing about a horizontal axis, cup-shaped bearings enclosing the ends of said trunnions and abutting against said flat body acting to prevent lateral swinging of said member, means for preventing the rotation of said bearings about said axis and means for pivotally connecting said member to the spring.

12. A spring shackle for vehicles comprising a casing adapted to be connected to the frame of a vehicle, a horizontal bolt mounted in said casing, a swinging member having laterally extending trunnions pivotally mounted on said bolt, cup-shaped bearings for said trunnions having linings of fibrous anti-friction material enclosing the ends of said trunnions and means for pivotally connecting said swinging member to the spring.

13. A spring shackle for vehicles comprising a casing adapted to be connected to the frame of a vehicle, a horizontal bolt mounted in said casing, a swinging member having laterally extending trunnions pivotally mounted on said bolt, cup-shaped bearings for said trunnions having linings of oil-soaked wood cut diagonally of the grain enclosing the ends of said trunnions and means for pivotally connecting said swinging member to the spring.

14. A spring shackle for vehicles comprising a casing adapted to be connected to the frame of a vehicle, a horizontal bolt mounted in said casing having an externally screw threaded head engaging complementary screw threads in one of the walls of said casing, a swinging member having laterally extending trunnions pivotally mounted on said bolt, cup-shaped bearings having linings of fibrous anti-friction material enclosing the ends of said trunnions, means for adjusting said bolt to take up wear between said bearings and said trunnions and means for pivotally connecting said swinging member to the spring.

15. A spring shackle for vehicles comprising a casing adapted to be connected to the frame of a vehicle, a horizontal bolt mounted in said casing having a cylindrical radially slotted and externally screw threaded head engaging complementary screw threads in one of the walls of said casing, a swinging member having laterally extending trunnions pivotally mounted upon said bolt, cup-shaped bearings having linings of fibrous anti-friction material enclosing the ends of said trunnions, the outer ends of said cup-shaped bearings engaging respectively the head of said bolt and the opposite wall of said casing, means for adjusting said bolt to take up wear between said trunnions and said bearings and an expanding screw traversing said slot operable to expand said bolt head and thereby to lock the same in adjusted position and means for pivotally connecting said swinging member to the spring.

16. A spring shackle for vehicles comprising a casing adapted to be connected to the frame of a vehicle, a horizontal bolt mounted in said casing, a swinging member having laterally extending trunnions pivotally mounted on said bolt, metallic cup-shaped bearings having linings of fibrous anti-friction material enclosing the ends of said trunnions mounted upon said bolt, means for preventing rotation of said bearings about said bolt and means for pivotally connecting said swinging member to the spring.

17. A spring shackle for vehicles comprising a casing adapted to be connected to the frame of a vehicle, a horizontal bolt mounted in said casing, a swinging member having laterally extending trunnions pivotally mounted on said bolt, metallic cup-shaped bearings having linings of fibrous anti-friction material enclosing the ends of said trunnions mounted upon said bolt, arms rigidly connected to said cup-shaped bearings, means for securing the ends of said arms to said casing adapted to prevent rotation of said bearings and means for pivotally connecting said swinging member to the spring.

18. A spring shackle for vehicles comprising a casing adapted to be secured to the frame of a vehicle, a member pivotally mounted in said casing to swing about a horizontal axis, a spheroidal socket in the end of said member, a ball fitting said socket having a flat base to engage the spring and a screw threaded stem to pass through a suitable aperture in the upper leaf of the spring and means for clamping said upper leaf to said base.

19. A spring shackle for vehicles comprising a casing adapted to be secured to the frame of a vehicle, a member pivotally mounted in said casing to swing about a horizontal axis, a spheroidal socket in the end of said member, a ball fitting said socket having a flat base to engage the spring and a screw threaded stem to pass through a suitable aperture in the upper leaf of the spring and means for clamping said upper leaf to said base including a spacing sleeve adapted to engage the under face of the upper leaf of the spring and a nut on said stem acting upon said sleeve to clamp the upper spring leaf against the base of said ball member whereby the slotted end portion of an underlying spring leaf may be moved relatively to the upper leaf without acting upon said stem.

20. A spring shackle for vehicles comprising a casing adapted to be secured to the frame of a vehicle, a member pivotally mounted in said casing to swing about a horizontal axis, a spheroidal socket in the end of said member, a ball fitting said socket having a flat base to engage the spring and a screw threaded stem to pass through a suitable aperture in the upper leaf of the spring and means for clamping said upper leaf to said base and means for preventing disengagement of said ball from its socket in event of abnormal relative movement of said frame and spring.

21. A spring shackle for vehicles comprising a casing adapted to be connected to the frame of a vehicle, a member comprising a body portion presenting parallel flat faces having trunnions extending therefrom pivotally mounted in said casing to swing about a horizontal axis, bearing members of anti-friction material located at a distance from the axis of said trunnions engaging opposite faces of said body portion and extending longitudinally of said trunnions beyond the ends thereof, acting to prevent lateral movement of said swinging member, means for preventing longitudinal displacement of said bearing members and means for connecting said swinging member to the spring of the vehicle.

22. A spring shackle for vehicles comprising a casing adapted to be connected to the frame of a vehicle, a member comprising a body portion presenting parallel flat faces having trunnions extending therefrom pivotally mounted in said casing to swing about a horizontal axis, bearing members of anti-friction material surrounding said trunnions engaging opposite faces of said body portion at a distance from said axis and extending longitudinally of said trunnions and beyond the ends thereof, means for preventing longitudinal displacement of said anti-friction bearing members and a universal joint connecting said swinging member to the spring of the vehicle.

In testimony whereof, I have signed my name to this specification.

RALPH M. LOVEJOY.